(12) United States Patent
Miller

(10) Patent No.: US 9,888,809 B2
(45) Date of Patent: Feb. 13, 2018

(54) STEAM OVEN INSTALLATION

(71) Applicant: Spirax-Sarco Limited, Cheltenham, Gloucestershire (GB)

(72) Inventor: Jeremy Miller, Cheltenham (GB)

(73) Assignee: SPIRAX-SARCO LIMITED, Cheltenham (GB)

( * ) Notice: Subject to any disclaimer, the term of this patent is extended or adjusted under 35 U.S.C. 154(b) by 28 days.

(21) Appl. No.: 14/598,373

(22) Filed: Jan. 16, 2015

(65) Prior Publication Data
US 2015/0204548 A1 Jul. 23, 2015

(30) Foreign Application Priority Data
Jan. 17, 2014 (GB) .................................. 1400807.2

(51) Int. Cl.
| | |
|---|---|
| *A47J 27/04* | (2006.01) |
| *A47J 37/04* | (2006.01) |
| *A23L 5/10* | (2016.01) |
| *A21B 1/48* | (2006.01) |
| *A21B 3/04* | (2006.01) |

(52) U.S. Cl.
CPC ............... *A47J 37/044* (2013.01); *A21B 1/48* (2013.01); *A21B 3/04* (2013.01); *A23L 5/13* (2016.08); *A23V 2002/00* (2013.01); *A47J 2027/043* (2013.01)

(58) Field of Classification Search
CPC ....................................................... A23L 5/13
USPC .................................................. 126/20, 369
See application file for complete search history.

(56) References Cited

U.S. PATENT DOCUMENTS

| | | | |
|---|---|---|---|
| 2,384,511 | A | 9/1945 | Wegmann |
| 4,556,572 | A | 12/1985 | Kaufman, Jr. et al. |
| 5,013,237 | A * | 5/1991 | Bergounhon ......... C04B 11/028 34/171 |
| 5,410,951 | A | 5/1995 | Ledet et al. |
| 5,609,095 | A | 3/1997 | Lemke et al. |

(Continued)

FOREIGN PATENT DOCUMENTS

| | | |
|---|---|---|
| EP | 1631175 A2 | 3/2006 |
| EP | 2439455 A1 | 4/2012 |

(Continued)

OTHER PUBLICATIONS

Dec. 18, 2015—(NL) Search Report—App No. 2014132—3 pages.

(Continued)

*Primary Examiner* — Avinash Savani
(74) *Attorney, Agent, or Firm* — Banner & Witcoff, Ltd.

(57) ABSTRACT

There is disclosed a steam oven installation, that in certain embodiments, comprises: a steam oven; a supply steam line for receive a superheated steam flow and for delivering supply steam to the steam oven; an injector for injecting a volume of control fluid into the supply steam line; a monitor for monitoring at least one thermodynamic property of steam within the steam oven installation; and a controller for controlling the injection of the control fluid based on the at least one monitored thermodynamic property so that the supply steam flow delivered into the steam oven comprises substantially dry saturated steam. There is also disclosed a corresponding method of controlling the supply of steam to a steam oven in a steam oven installation.

20 Claims, 2 Drawing Sheets

(56) References Cited

U.S. PATENT DOCUMENTS

| | | | |
|---|---|---|---|
| 7,069,841 B2 | 7/2006 | Ledet et al. | |
| 2005/0115559 A1* | 6/2005 | Hwang | A47J 27/04 126/369 |
| 2006/0088301 A1* | 4/2006 | Kanzaki | H05B 6/6479 392/386 |
| 2007/0104844 A1 | 5/2007 | Fraccon et al. | |
| 2008/0053317 A1* | 3/2008 | Estermann | F24C 15/2007 99/468 |
| 2008/0283040 A1* | 11/2008 | Manganiello | A21B 3/04 126/369.2 |
| 2009/0272371 A1* | 11/2009 | Nothum, Jr. | A21B 1/48 126/19 R |
| 2012/0043318 A1* | 2/2012 | Komuro | F24C 15/006 219/757 |
| 2012/0055459 A1* | 3/2012 | Ley, III | A21B 3/04 126/20 |
| 2012/0085244 A1* | 4/2012 | Giazzon | F24C 15/327 99/330 |
| 2012/0318252 A1 | 12/2012 | Seitz et al. | |

FOREIGN PATENT DOCUMENTS

| | | | |
|---|---|---|---|
| GB | 399937 | A | 10/1933 |
| JP | 2009284772 | A | 12/2009 |
| WO | 2008009686 | A2 | 1/2008 |
| WO | 2013131959 | A1 | 9/2013 |

OTHER PUBLICATIONS

Intellectual Property Office of Great Britain, "Search Report," issued in connection with GB1400807.2, dated Aug. 20, 2014, 3 pages.

* cited by examiner

STEAM OVEN INSTALLATION

CROSS-REFERENCE TO RELATED APPLICATIONS

The present application claims priority to GB 1400807.2, filed on 17 Jan. 2014, which is hereby incorporated by reference in its entirety for any and all non-limiting purposes.

BACKGROUND

The invention relates to a steam oven installation having a steam oven. The invention also relates to a method of controlling the supply of steam to a steam oven in a steam oven installation.

It is known to provide a steam oven for cooking, amongst other things, foodstuffs. However, it can be difficult to precisely control the conditions within the steam oven. Previously considered steam oven installations allow the flow rate of steam delivered to a steam oven to be adjusted. However, such installations do not allow precise control of the steam conditions within the steam oven. Accordingly, it is desirable to provide an improved steam oven installation.

SUMMARY

According to a first aspect of the invention there is provided a steam oven installation comprising: a steam oven; a supply steam line for receiving a superheated steam flow and for delivering supply steam to the steam oven; an injector for injecting a volume of control fluid into the supply steam line; a monitor for monitoring at least one thermodynamic property of steam within the steam oven installation; and a controller for controlling the injection of the control fluid based on the at least one monitored thermodynamic property so that the supply steam flow delivered into the steam oven comprises substantially dry saturated steam. The steam oven installation is therefore configured to control the enthalpy of the supply steam.

Dry saturated steam is steam at saturation temperature and in the absence of saturated liquid water, and is typically represented in steam charts by the "dry saturated steam" or "saturated steam" line. Substantially dry saturated steam is steam close to or on the dry saturated steam line, i.e. with a dryness approaching 100% or a small level of superheat.

The steam installation may further comprise a static mixer for mixing the control fluid with the superheated steam flow. The injector and the mixer may be a single unit. The injector and the mixer may be integrally formed.

The monitor may comprise at least one sensor. A sensor may be disposed in the supply steam line downstream of the injector. In this regard, certain embodiments may capture data with various electronic sensors and/or devices. In other embodiments, the present invention can be partially or wholly implemented on a tangible non-transitory computer-readable medium, for example, by storing computer-executable instructions or modules. Of course, the methods and systems of embodiments may also include other additional elements, steps, computer-executable instructions, or computer-readable data structures.

The steam oven installation may further comprise at least one nozzle for ejecting the supply steam into the steam oven. A sensor may be disposed within the steam oven adjacent to the nozzle.

The monitor may comprise at least one temperature sensor for monitoring the temperature of the supply steam flow. The monitor may comprise at least one pressure sensor for monitoring the pressure of the supply steam flow.

The monitor may comprise at least one steam dryness sensor for monitoring the steam dryness of the supply steam flow.

The controller may be arranged to control an injection flow rate at which the control fluid is injected into the supply steam line. The controller may be configured to control the injection of the control fluid so that the supply steam flow delivered into the steam oven is at least at the saturation temperature of the steam and no more than 5° C. above the saturation temperature of the steam. The controller may be configured to intermittently inject control fluid into the supply steam line.

The supply steam flow delivered into the steam oven may be determined to be substantially dry saturated steam when the temperature of the steam is at least the saturation temperature and no more than 1° C., 2° C., 5° C. or 10° C. above the saturation temperature. Further, the supply steam flow delivered into the steam oven may be determined to be substantially dry saturated steam when the steam dryness is no less than 95%, no less than 98%, no less than 99% or 100%.

The controller may be configured to control the injection of the control fluid based on the properties of supply steam flow at a monitoring point upstream of the nozzle so that the supply steam flow delivered into the steam oven comprises substantially dry saturated steam.

The injector may be arranged to inject water as the control fluid into the supply steam line.

The monitor may be arranged to continually or periodically monitor the at least one thermodynamic property. The controller may be configured to continuously or periodically control the injection of the control fluid.

The steam oven installation may further comprise a supply steam controller which is arranged to control the delivery of the supply steam flow to the steam oven to ensure that steam leaks from the inlet and/or the outlet based on a steam leakage determining module which is arranged to determine whether steam is leaking from the inlet and/or the outlet of the steam oven.

The supply steam controller may be arranged to increase the steam flow rate at which the supply steam flow is delivered into the steam oven if the steam leakage determining module determines that steam is not leaking from the inlet and/or the outlet of the steam oven.

The steam leakage determining module may comprise a temperature sensor for monitoring the temperature in the region of the inlet and/or the outlet.

The steam oven installation may further comprise a conveyor for conveying articles through the steam oven.

According to a second aspect of the invention there is provided a method of controlling the supply of steam to a steam oven in a steam installation, comprising: injecting a volume of control fluid into a superheated steam flow and delivering the resultant supply steam flow into the steam oven; monitoring at least one thermodynamic property of steam within the steam installation; and controlling the injection of the control fluid based on the at least one monitored thermodynamic property such that the supply steam flow delivered into the steam oven comprises substantially dry saturated steam. The enthalpy of the supply steam delivered into the steam oven is therefore controlled.

The method may further comprise mixing the control fluid with the superheated steam flow.

Monitoring the at least one thermodynamic property of the steam may comprise monitoring the temperature of the supply steam flow. Monitoring the at least one thermodynamic property of the steam may comprise monitoring the steam dryness of the supply steam flow. Monitoring the at least one thermodynamic property of the steam may comprise monitoring the pressure of the supply steam flow.

The supply steam flow may be delivered through at least one supply steam line to the steam oven where it is ejected into the steam oven through at least one nozzle.

The at least one thermodynamic property of the supply steam flow may be monitored in the supply steam line downstream of the injection of the control fluid. The at least one thermodynamic property of the supply steam flow may be monitored within the steam oven adjacent to a nozzle.

Controlling the injection of the control fluid may comprise controlling an injection flow rate at which the control fluid is injected into the superheated steam flow.

The injection of the control fluid may be controlled such that the supply steam delivered into the steam oven is at least at the saturation temperature of the steam and no more than 5° C. above the saturation temperature of the steam. The method may comprise intermittently injecting the control fluid.

The injection of the control fluid may be controlled based on the properties of supply steam flow at a monitoring point upstream of the nozzle so that the supply steam flow delivered into the steam oven comprises substantially dry saturated steam.

The control fluid may be water.

The at least one thermodynamic property may be continually or periodically monitored. The injection of the control fluid may be continuously or periodically controlled.

The method may further comprise determining whether steam is leaking from the inlet and/or outlet of the steam oven, and based on this, controlling the delivery of the supply steam to the steam oven to ensure that steam leaks from the inlet and/or outlet. The method may comprise increasing the steam flow rate at which supply steam flow is delivered into the steam oven if it is determined that steam is not leaking from the inlet and/or outlet of the steam oven.

Determining whether steam is leaking from the inlet and/or outlet of the steam oven may comprise monitoring the temperature in the region of the inlet and/or outlet.

BRIEF DESCRIPTION OF DRAWINGS

The invention will now be described, by way of example, with reference to the following drawings, in which.

DETAILED DESCRIPTION

Figure 1:
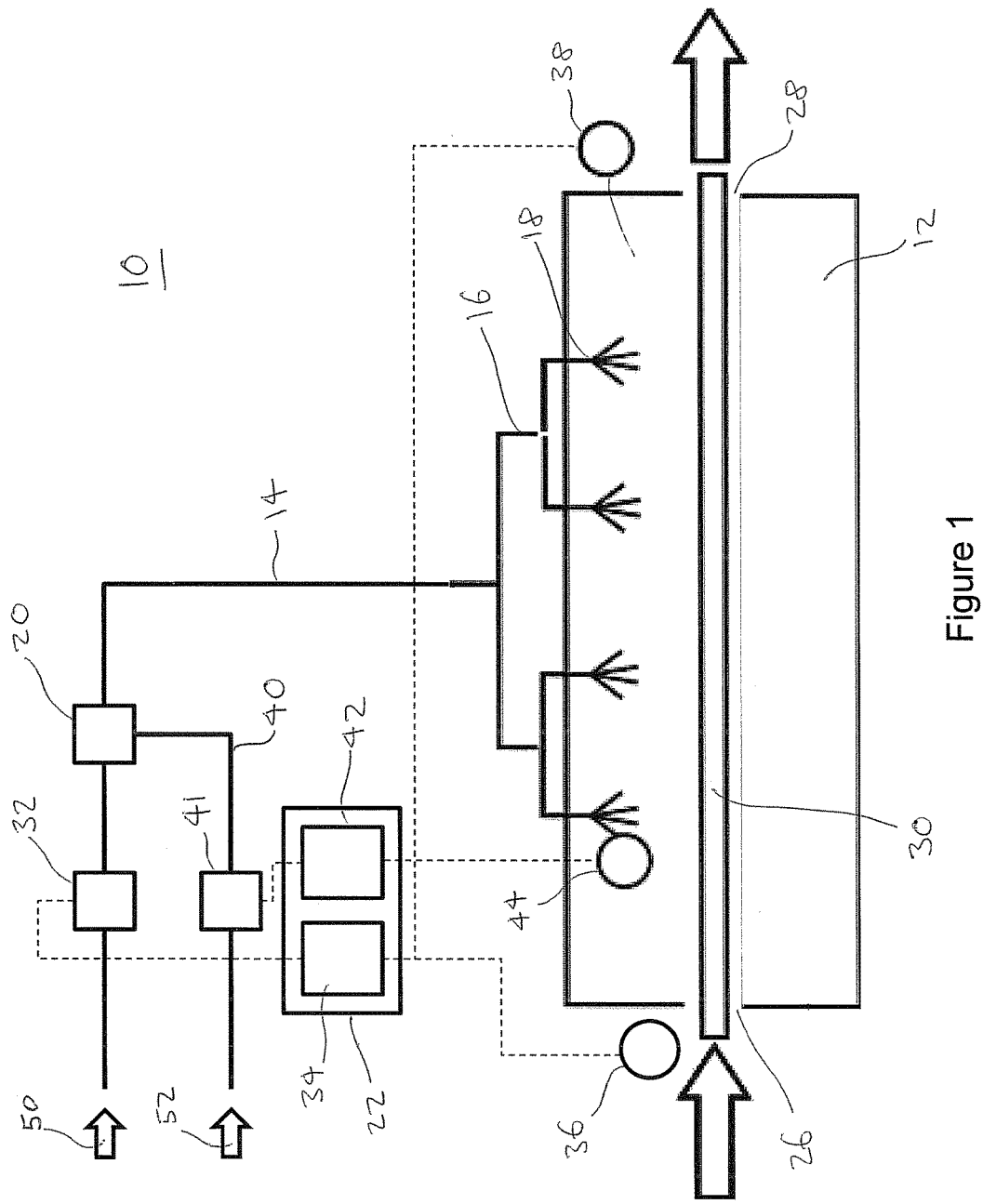
FIG. 1 schematically shows a first embodiment of a steam oven installation according to the invention.

FIG. 1 shows a steam oven installation 10 comprising a steam oven 12 and a supply steam line 14 arranged to provide supply steam to the steam oven 12 via an ejector header 16 extending into the steam oven 12. In use, the enthalpy of the steam within the steam line 14 is controlled by a controller 22 such that the supply steam delivered into the steam oven 12 is substantially dry saturated steam.

The steam oven 12 has an inlet 26 and an outlet 28, and a conveyor 30 extends from the inlet 26 to the outlet 28 for conveying foodstuffs into, through and out of the steam oven 12. In this embodiment, the inlet 26 and the outlet 28 are at least partially open such that a leakage flow of steam may flow from within the steam oven 12 out of the inlet 26 and/or the outlet 28.

The ejector header 16 is arranged to receive supply steam from the steam line 14 and distribute it into the steam oven 12. The ejector header 16 is coupled to the steam line 14 outside of the steam oven, and has a series of distribution pipes extending into the steam oven 12 terminating at nozzles 18 for ejecting the supply steam into the steam oven 12. The distribution pipes of the ejector header 16 are all of the same length and are arranged to effect the same pressure drop of the supply steam within the steam line 14.

The steam oven installation is configured to control the enthalpy of the supply steam flow, as described in detail below.

The steam line 14 is coupled to a source of superheated steam 50 so as to receive superheated steam. Superheated steam is steam that is at a temperature higher than the saturation temperature (which is dependent on the pressure of the steam). In this embodiment, the steam line 14 is arranged to receive superheated steam marginally above atmospheric pressure (e.g. 0.2 bar gauge), and so the saturation temperature is marginally above 100° C. (e.g. 105° C.). In other embodiments, the source of superheated steam may be at atmospheric pressure or pressurised (e.g. by 1 bar gauge) and subsequently expanded within the steam line 14 and/or upon entry into the steam oven 12.

A steam flow valve 32 is disposed in the steam line 14 for controlling the flow of superheated steam in the steam line 14. The steam flow valve 32 is controlled by a steam flow controller 34, which is configured to adjust the steam flow rate at which steam flows through the steam flow valve 32.

The steam flow controller 34 is coupled to steam leakage determining modules 36, 38 disposed adjacent to the inlet 26 and the outlet 28 of the steam oven 12 respectively. In this embodiment, the steam leakage determining modules 36, 38 comprise temperature sensors arranged to monitor the temperature in the region of the inlet and the outlet 26, 28. In this embodiment, the steam flow controller 34 is configured to receive temperature signals from the steam leakage determining modules 36, 38 and to determine whether steam is leaking from the inlet 26 and/or outlet 28 respectively depending on whether the respective temperature signal is above a threshold. In this embodiment, the threshold is marginally below the saturation temperature, for example, 1° C. below (i.e. 99° C. when the steam oven operates at atmospheric pressure).

The steam flow controller 34 is configured to increase the steam flow rate if it is determined that steam is not leaking from the inlet 26 and/or the outlet 28. Conversely, the steam flow controller 34 is configured to maintain or periodically reduce the steam flow rate if it is determined that steam is leaking from both the inlet 26 and the outlet 28. The presence of a leakage flow from the inlet and outlet indicates that the steam oven chamber is fully occupied with steam.

An injector 20 is disposed in the steam line 14 downstream of the steam flow valve 32, and is arranged to inject a control fluid, which in this embodiment is water, with the superheated steam flow to provide the supply steam flow for the steam oven 12.

In this embodiment the injector 20 includes a static mixer that is configured to mix the control fluid (water) with the superheated steam flow to provide a homogeneous mix of water droplets and steam. In this embodiment the static mixer comprises a series of elements for repeatedly dividing and subsequently turbulently mixing the flow. In other embodiments, the mixer may be arranged to mix by virtue of turbulence alone, for example it may comprise an orifice plate, or may be formed by the convolutions (or corrugations) within a flexible hose. Further, the mixer may be a separate unit provided downstream of the injector.

The water is provided from a water supply 52 to the injector 20 via a water line 40. A water flow control valve 41 is disposed in the water line 40 for controlling the flow of water to the injector 20. The water flow control valve 41 is controlled by a water controller 42 of the controller 22, which is configured to adjust the injection flow rate of water into the injector 20.

The water controller 42 is coupled to a monitor 44 arranged to monitor at least one thermodynamic property of steam within the steam oven installation, and is configured to determine whether the supply steam delivered into the steam oven 12 is substantially dry saturated steam.

In this embodiment, the monitor 44 is a temperature sensor disposed adjacent to an ejector nozzle 18 of the ejector header 16. It will be appreciated that in other embodiments the monitor 44 may comprise a plurality of temperature sensors disposed adjacent to respective ejector nozzles 18 of the ejector header 16. The monitor 44 may further comprise one or more pressure sensors so that the saturation temperature within the steam oven 12 may be determined. The water controller 42 is configured to receive a temperature signal from the monitor 44 and determine whether the supply steam flow delivered to the steam oven 12 is substantially dry saturated steam depending on whether the temperature signal is at or above a lower threshold and at or below an upper threshold. The lower threshold and upper threshold are set with respect to the saturation temperature of the supply steam, which in this embodiment is 100° C. as the steam oven 12 operates at atmospheric pressure.

The water controller 42 is configured to increase the injection flow rate at which water is supplied to the injector 20 if it is determined that the temperature of the supply steam flow is above the upper threshold, and is configured to decrease the injection flow rate of water to the injector if it is determined that the temperature of the supply steam flow is below the lower threshold.

Operation of the steam oven installation will now be described. In the following description, given values of steam properties are provided by way of example only.

In a start-up phase of operation, the steam oven 12 is cool. A supply of superheated steam at 0.2 bar gauge pressure and at a temperature of 110° C. is provided to the steam line 14. The saturation temperature of steam at 0.2 bar gauge is approximately 105° C., and so the steam is superheated. The steam flow controller 34 controls the steam flow valve 32 to allow steam to flow to the injector 20 and into the steam oven 12 via the ejector header 16.

The water controller 42 periodically determines the properties of the steam flow delivered into the steam oven 12 by monitoring the temperature signal from the temperature sensor 44 at a frequency of once every 10 seconds. The lower threshold temperature is set at 100° C. and the upper threshold temperature is set at 102° C. In other embodiments, different lower and upper thresholds may be set, for example, they may be 100° C. and 104° C. respectively, or 102° C. and 105° C. respectively.

The water controller 42 periodically controls the water flow control valve 41 to adjust the injection flow rate until the water controller 42 determines that the temperature of the supply steam delivered into the steam oven 12 lies between the lower and upper thresholds.

In this embodiment the superheated steam is received above atmospheric pressure at 0.2 bar gauge. Accordingly, when water is injected and mixed with the superheated steam at the injector 20 the resultant supply steam is a homogeneous mix of water droplets and steam (i.e. wet steam). As the pressure of the supply steam is reduced in the steam line 14 and in the distribution pipes of the ejector header 16, the steam undergoes isenthalpic expansion and vaporises the surrounding water droplets, rather than becoming superheated. The water controller 42 controls the injection of water such that the supply steam expands to substantially dry saturated steam at atmospheric pressure upon delivery into the steam oven.

The steam controller 34 of the controller 22 periodically determines whether steam is leaking from the inlet and/or the outlet at a frequency of once every 10 seconds based on the signals provided by the steam leakage determining modules 36, 38. In the start-up condition, there will be no leakage flow. Accordingly, the steam controller 34 controls the steam flow valve 32 to adjust the steam flow rate until the steam controller 34 determines that steam is leaking from both the inlet 26 and the outlet 28. In other words, the steam controller 34 controls the steam flow valve 32 to increase the steam flow rate until it is determined that the temperature signals from the steam leakage determining modules 36, 38 correspond to a leakage flow temperature greater than the lower leakage threshold, which in this embodiment is marginally below the saturation temperature (e.g. 1° C. below, or 99° C. when the steam oven operates at atmospheric pressure).

The steam controller 34 may periodically execute an economising operation in which it controls the steam flow valve 32 to reduce the steam flow rate until it is determined that steam is not leaking from at least one of the inlet 26 and the outlet 28, and then once more increases the steam flow rate a sufficient amount so that steam leakage is determined at both the inlet 26 and the outlet 28. This economising operation ensures that the steam flow rate is not unnecessarily high.

The steam controller 34 and the water controller 42 of the controller 22 continue to periodically monitor the steam flow and control the enthalpy of the supply steam so as to maintain the delivery of substantially dry saturated steam into the steam oven 12 throughout operation of the steam installation 10.

Figure 2:
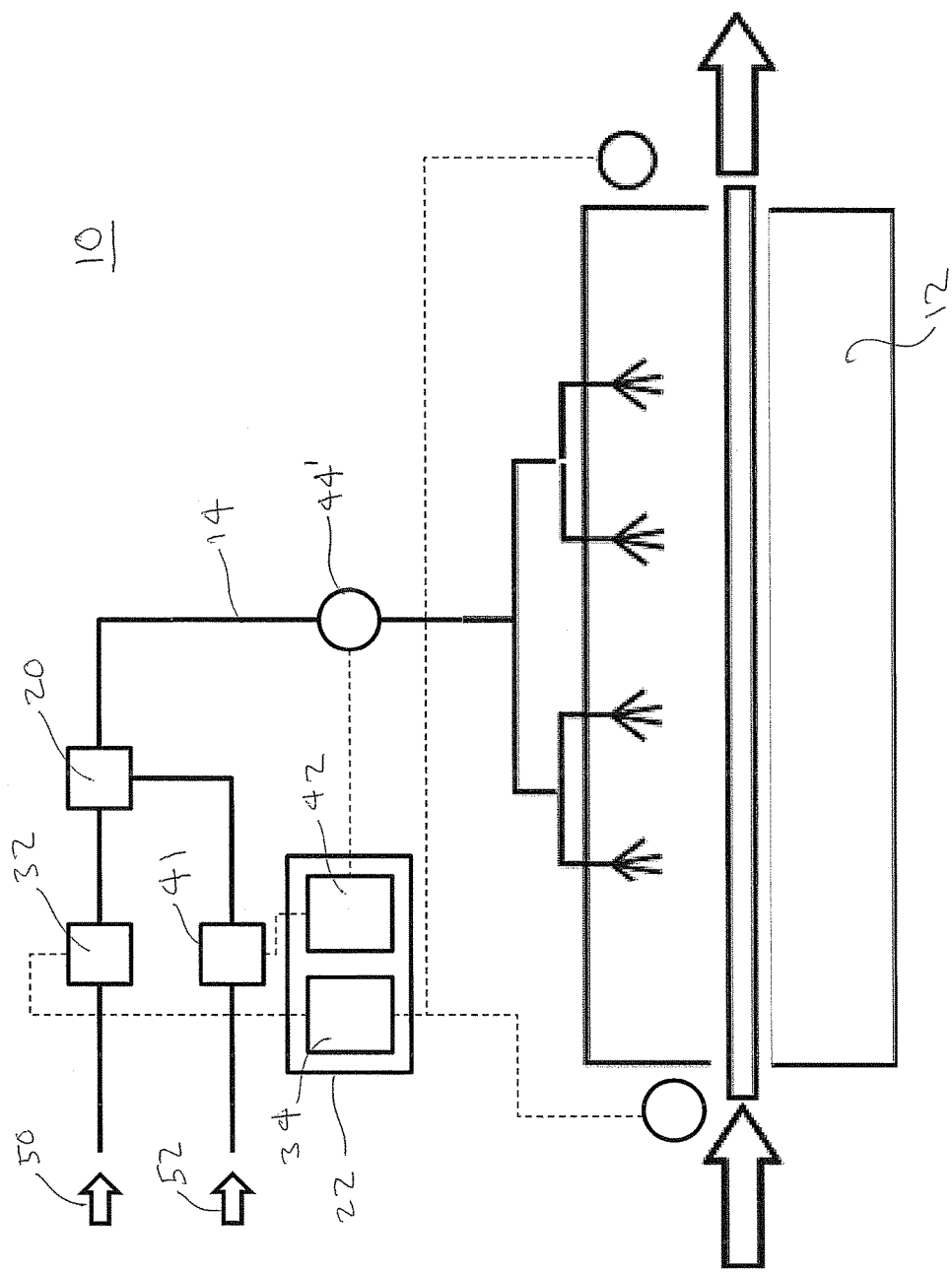
FIG. 2 schematically shows a second embodiment of a steam oven installation according to the invention.

FIG. 2 shows a second embodiment of the invention which differs from the first in that the monitor 44' comprises a sensor disposed in the steam line 14 downstream of the injector 20 and upstream of the ejector nozzles 18.

The properties of the supply steam may change between the monitor 44' and the ejector nozzles 18. For example, the supply steam may be superheated at the monitor 44', and may be cooled to provide substantially dry saturated steam at the ejector nozzles 18.

As with the first embodiment, the pressure within the steam line 14 may be higher than the pressure in the steam oven 12. Accordingly, the supply steam within the steam line may comprise wet steam (i.e. a mixture of saturated steam and saturated liquid water at saturation temperature) at a first high pressure (for example, 0.2 bar gauge), and subsequently expand within the steam line or upon entry into the steam oven chamber to atmospheric pressure to provide substantially dry saturated steam at the ejector nozzles 18.

As with the first embodiment, the water controller 42 and the monitor 44' are calibrated to control the injection of water based on lower and upper thresholds for steam properties monitored by the monitor 44', which are set to correspond to the delivery of substantially dry saturated steam into the steam oven.

In this embodiment, the monitor 44' comprises a steam dryness sensor, and the lower and upper thresholds are therefore lower and upper thresholds of steam dryness.

In one example mode of operation, the pressure of the steam at the monitor 44 is 0.2 bar gauge, and the pressure within the steam oven 12 is atmospheric pressure. The lower and upper thresholds in this embodiment are 90% and 95% steam dryness respectively, and so the supply steam at the monitor 44' is wet steam, but will expand in the steam line 14 and ejector header 16 to form substantially dry saturated steam.

Accordingly, the controller 22 controls the enthalpy of the supply steam at a point upstream of the steam oven 12 to reach particular conditions which correspond to the downstream delivery of substantially dry saturated supply steam into the steam oven 12.

An advantage of the invention is that the supply of steam to the oven can be controlled to ensure that the steam within the oven is substantially dry saturated steam. Substantially dry saturated steam may be desirable for a steam oven because it enables a high rate of heat transfer between the steam and the articles within the oven, such as foodstuffs. Further, unlike superheated steam, substantially dry saturated steam will not dry the foodstuffs.

It will be appreciated that the term "substantially saturated" is intended to cover the region on and around the dry saturated steam line of a steam chart. This typically includes wet steam which has a high steam dryness (e.g. at least 90%, at least 95%, at least 98%, at least 99% or 100%). Further, it typically includes steam that is 100% dry having a relatively low level of superheat (i.e. a temperature above the saturation temperature), such as up to 1° C., up to 2° C., up to 5° C. or up to 10° C. of superheat.

The mixer, provided integrally with the injector or downstream of it, ensures a homogeneous mix of water droplets and steam in the supply line. Since the various distribution pipes of the ejector header are of the same length and, as a consequence, configured to effect the same pressure drop, this ensures that in each pipe (or branch) the steam expands in the same way to form substantially dry saturated steam.

Although embodiments of the invention have been described in which there are two steam leakage determining modules at the inlet and outlet of the steam oven respectively, it will be appreciated that in other embodiments there may be a single steam leakage determining module or there may be more than two steam leakage determining modules.

Although embodiments of the invention have been described in which the steam flow controller determines whether steam is leaking from the inlet and/or the outlet of the steam oven based on a temperature signal from a respective steam leakage determining module, it will be appreciated that in other embodiments the steam leakage determining module may determine whether steam is leaking and communicate that determination to the steam flow controller.

Although embodiments of the invention have been described in which superheated steam is received in the steam line at approximately atmospheric pressure, it will be appreciated that in other embodiments superheated steam may be received at a positive gauge pressure, and may be expanded in the steam line or upon entry to the steam oven. Further, the superheated steam may be at higher pressure upstream of the steam flow valve, and may expand as it flows through the steam flow valve.

I claim:

1. A steam oven installation comprising:
a steam oven;
a supply steam line for receiving a superheated steam flow and for delivering supply steam to the steam oven;
an injector for injecting a volume of control fluid into the superheated steam flow in the supply steam line;
a monitor for monitoring at least one thermodynamic property of steam within the steam oven installation; and
a controller for controlling the injection of the control fluid into the superheated steam flow in the supply line based on the at least one monitored thermodynamic property so that the supply steam delivered from the supply steam line into the steam oven comprises substantially dry saturated steam.

2. A steam oven installation according to claim 1, further comprising a static mixer configured to mix the control fluid with the superheated steam flow.

3. A steam oven installation according to claim 2, wherein the injector and the mixer are a single unit.

4. A steam oven installation according to claim 1, wherein the monitor comprises at least one sensor.

5. A steam oven installation according to claim 1, wherein a sensor is disposed in the supply steam line downstream of the injector.

6. A steam oven installation according to claim 1, further comprising at least one nozzle configured to eject the supply steam into the steam oven.

7. A steam oven installation according to claim 6, wherein the at least one nozzle comprises a first nozzle, and wherein the installation further comprises a sensor disposed within the steam oven adjacent to the first nozzle.

8. A steam oven installation according to claim 1, wherein the monitor comprises at least one temperature sensor configured to monitor the temperature of the supply steam flow.

9. A steam oven installation according to claim 1, wherein the monitor comprises at least one pressure sensor configured to monitor the pressure of the supply steam flow.

10. A steam oven installation according to claim 1, wherein the monitor comprises at least one steam dryness sensor configured to monitor the steam dryness of the supply steam flow.

11. A steam oven installation according to claim 1, wherein the controller is arranged to control an injection flow rate at which the control fluid is injected into the supply steam line.

12. A steam oven installation according to claim 1, wherein the controller is configured to control the injection of the control fluid so that the supply steam flow delivered into the steam oven is both: at least at a saturation temperature of the supply steam and equal to or less than 5° C. above the saturation temperature of the supply steam.

13. A steam oven installation according to claim 1, wherein the injector is arranged to inject water as the control fluid into the supply steam line.

14. A steam oven installation according to claim 1, wherein the monitoring of the at least one thermodynamic property by the monitor is selected from the group consisting of: continually, periodically, or a combination thereof.

15. A steam oven installation according to claim 1, wherein the control of the injection of the control fluid by the controller is selected from the group consisting of: continuous control and periodic control.

16. A steam oven installation according to any one of the preceding claims, further comprising:

a steam leakage determining module which is arranged to determine whether steam is leaking from an inlet or an outlet of the steam oven; and a supply steam controller which, based at least in part on a signal from the steam leakage determining module determining that steam is leaking from the inlet or the outlet of the steam oven, is arranged to control the delivery of the supply steam to the steam oven.

17. An installation according to claim 16, wherein the supply steam controller is arranged to increase a steam flow rate at which the supply steam flow is delivered into the steam oven if the steam leakage determining module determines that steam is not leaking from at least one of the inlet and the outlet of the steam oven.

18. An installation according to claim 16, wherein the steam leakage determining module comprises a temperature sensor configured to monitor the temperature proximate to at least one of the inlet and the outlet.

19. A steam oven installation according to claim 1, further comprising a conveyor configured to convey articles through the steam oven.

20. A method of controlling the supply of steam to a steam oven in a steam installation, comprising:

injecting a volume of control fluid into a superheated steam flow and delivering a resultant supply steam flow into the steam oven;

monitoring at least one thermodynamic property of steam within the steam installation; and controlling the injection of the control fluid based on the at least one monitored thermodynamic property such that the supply steam flow delivered into the steam oven comprises substantially dry saturated steam.

\* \* \* \* \*